UNITED STATES PATENT OFFICE.

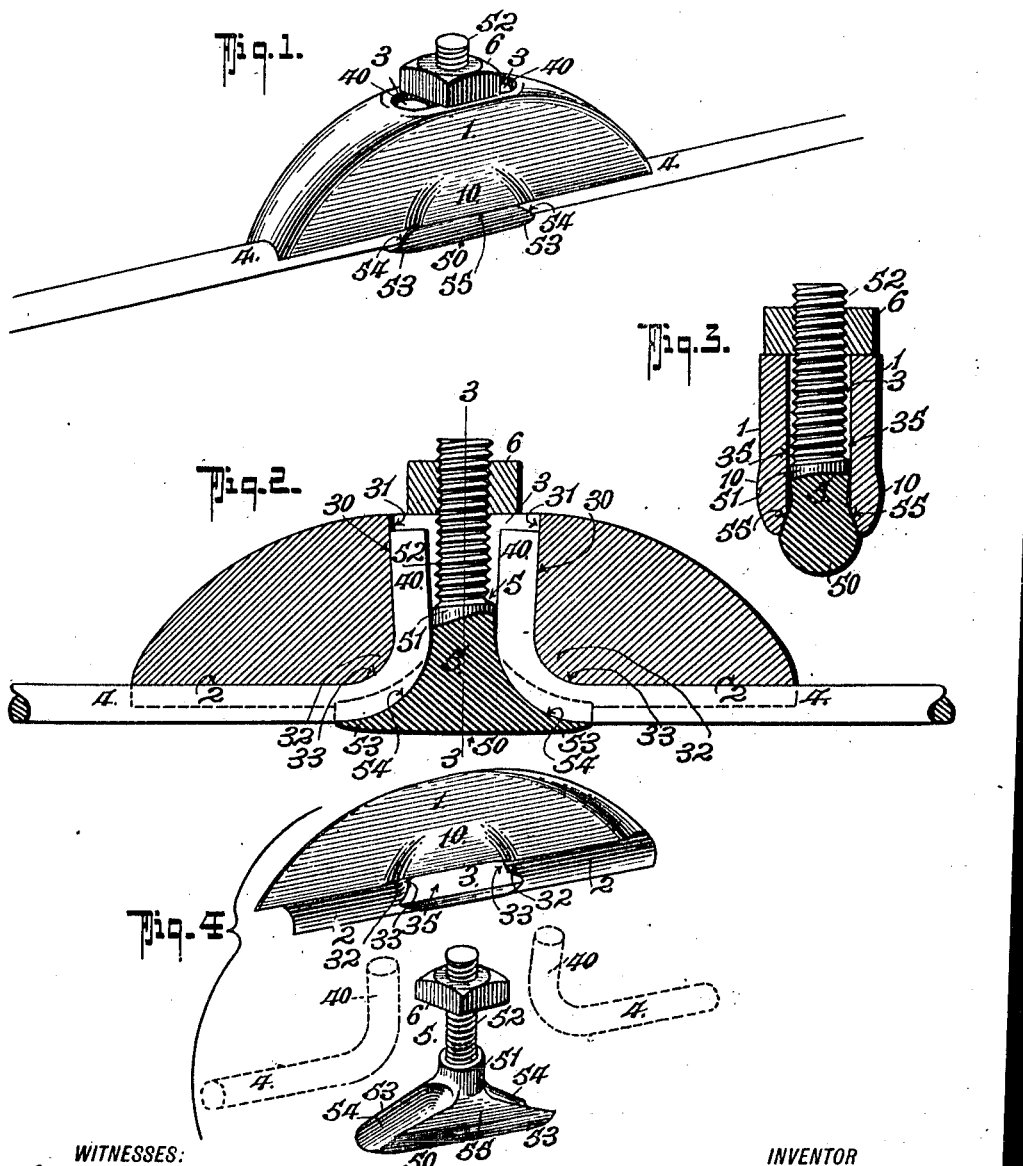

CHARLES ALBERT GEORGE, OF SPRINGFIELD, ILLINOIS.

WIRE-SPLICER.

1,048,521.   Specification of Letters Patent.   Patented Dec. 31, 1912.

Application filed March 9, 1912. Serial No. 682,650.

*To all whom it may concern:*

Be it known that I, CHARLES A. GEORGE, residing at Springfield, in the county of Sangamon and State of Illinois, have invented a new and Improved Wire-Splicer, of which the following is a specification.

This invention relates to that class of devices used for connecting the ends of trolley or other wires and it has for its object to provide a device of the general character stated in which the parts are so designed that they may be economically made and quickly assembled for use.

Another object of my invention is to provide a splicing appliance for trolley wires in which the clamping means includes a movable member having such action, in its adjustments, whereby to so coöperate with the body or shield member that the clamping or tensile strain is evenly distributed over the body and the movable member and the ends of the wire positively seated and held from displacement or separation under ordinary uses and in such a manner that arcing at the splice, is practically eliminated.

With the above objects in view, my invention consists in a wire splicing device that embodies the peculiar combination and novel arrangement of parts, all of which will be hereinafter fully explained, specifically pointed out in the appended claims and illustrated in the accompanying drawings, in which:

Figure 1, is a perspective view of my wire splicing device, as in use. Fig. 2, is a longitudinal section thereof. Fig. 3, is a cross section of the same on the line 3—3 on Fig. 2 and Fig. 4, is a perspective view of the several parts that constitute the splicer, separated, the adjoining ends of the wire to be connected, being shown in dotted lines.

The body portion or member 1 of the splicer is of cast brass, or other suitable metal, the under face of which has longitudinal wire receiving seats or channels 2, that merge with the lower end of an elongated slot 3 in the body, the opposite edges 31 of which are concaved to form seats 30 to receive the wire ends 40—40 of the wire sections 4—4.

The slot 3 has its seat edges, tapered whereby to provide a slotway or opening of a gradually increasing length from the bottom upwardly and the said opposite slot edges, at the lower or restricted end of the slot, merge with abrupt segmental bearings 32 which also have seats 33 that join the seats 30 in the long seats 2, as is clearly shown in Fig. 2, the purpose of which will presently appear.

5 designates a clamping wedge comprising a head 50 that terminates in a straight shank portion 51 of one diameter and a threaded shank 52 of a slightly less diameter than the shank 51, and lateral extensions 53 concaved in cross section to form seats 54 for the wire ends. The head 5 is rounded at the bottom and is of a greater thickness than the width of the slot 3 in the body 1 and from the said rounded end, the sides of the head taper inwardly as at 54 and merge with the shank portion 51.

It will be noticed by referring again to Fig. 2 of the drawing, the seats 54 in the head are of substantially segmental shape, and are on the arc of the segmental abutments or bearings 32 and that the shank portion 51 of the head is of such length that it extends above the said bearings 32 when the parts are assembled, the purpose of which will presently appear. To provide against undue lateral strain on the body 1, the same, where the beveled sides 54 of the head enter the slot 3, is thickened as at 10.

6 designates the clamping nut that rides across the top of the slot 3 and bears upon the upper edge of the body 1.

By reason of the peculiar construction of the parts, as shown and described, when it is desired to connect the adjacent ends of opposing wire sections, the ends of the said sections are bent at an angle and slipped into the slotway 3 of the head 1. The clamping member 5 is then slipped into the said slot 3 from the bottom and its threaded end projected through the top of the slot 3, in position to receive the clamping nut 6. By tightening up the clamping wedge, the wire ends will be firmly gripped and locked against the segmental bearings 33, and since the shank 51 and the curved seats of the head 50 extend above the bearing 33, it follows that as the clamp is drawn up, the wire ends *x—y* will spread away from the screw shank and seat solid in the tapered seats 30 in the opposite ends of the slot 3. Furthermore, since the sides of the head 5 taper they become solidly wedged within the thickened lower side walls 35 of the slot 3; see Fig. 3, and thereby hold the wedge clamp from lateral displacement or rattling, or in other words, the ends of the wire will be fixedly held clamped and locked on the body 1 with the pull strain of the wire ends distributed uniformly over the said body 1 and the wedge clamp; while the said clamp is fixedly held against lateral rattling.

What I claim is:

1. A wire splicing device, comprising a body having a longitudinal slot for receiving the adjacent turned ends of the wire sections and having seats for said sections, a clamping wedge having portions for seating the wire ends and clamping them adjacent the opposing slot faces of the body, said wedge including a head shaped to wedge sidewise between the lower faces of the body slot, the said clamping wedge including a threaded shank, and a lock nut for engaging the threaded shank and the top of the slotted body.

2. A wire splicing device comprising a body having a central elongated slot and wire seats that merge with the slot, the merging parts of the slot and the seats forming segmental bearing surfaces, a wedge clamp having oppositely extending members for engaging the wire ends and forcing them against segmental bearing surfaces, said clamping wedge having an extendible shank portion for engaging and spreading the two wire ends, and having a supplemental threaded shank for extending through the slot in the body, and a clamp nut for engaging the screw shank and the body.

3. A wire splicing device comprising a body having a central elongated slot, the end faces of which form wire seats and which taper inwardly from the top toward each other and have their lower ends terminate in segment bearings, the under face of the body having wire seats that merge with the segmental bearings, a clamping wedge, said wedge including lateral curved seats for engaging the wire ends and forcing them against the segmental bearings, an extended shank for engaging the wire ends at points above the segmental bearings whereby to spread the said ends against the tapered edges of the slot, and a screw shank that extends beyond the top of the body and a nut for engaging the said screw shank and the top of the body, the clamping head having tapered opposite sides for wedging sidewise in the lower part of the slotway in the body.

CHARLES ALBERT GEORGE.

Witnesses:
J. L. SMITH,
JOHN T. HEADRICK.